United States Patent Office 3,507,773
Patented Apr. 21, 1970

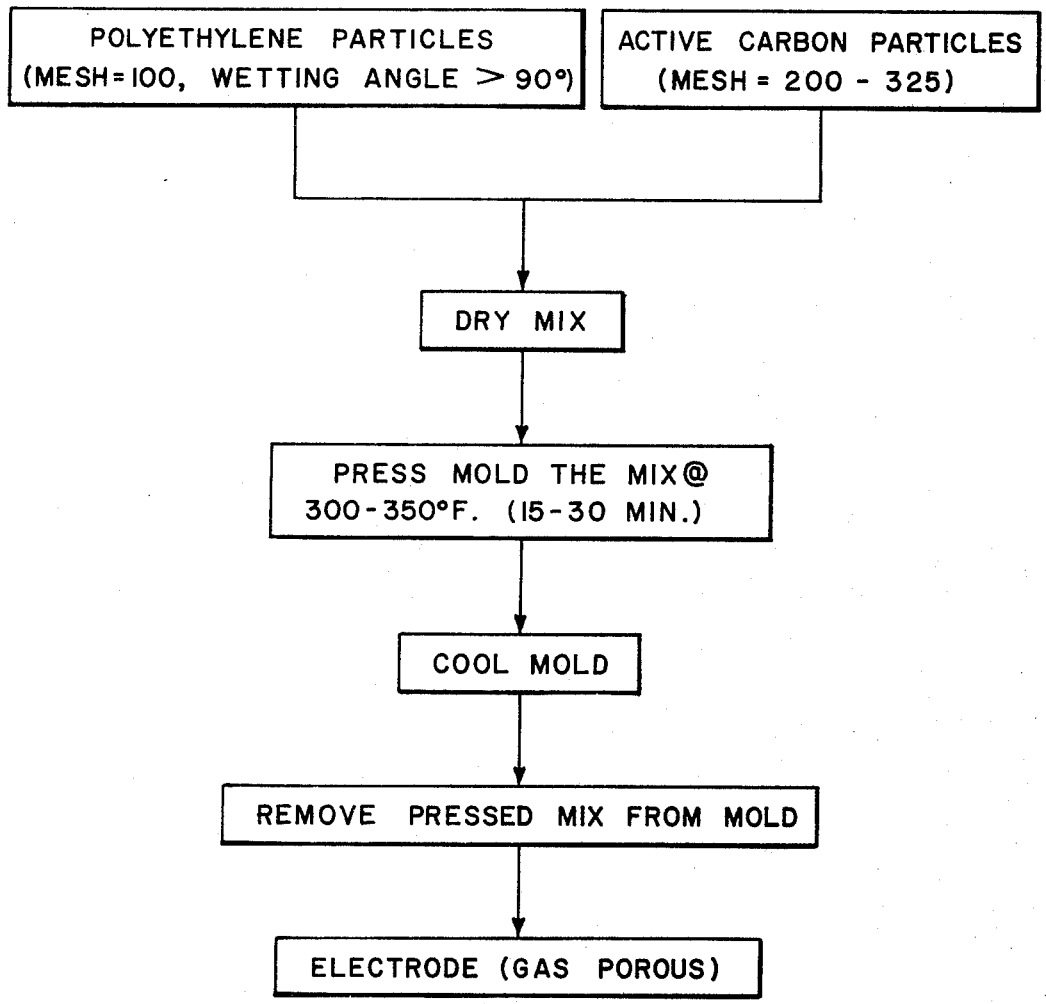

3,507,773
ELECTRODE FOR USE IN ELECTROLYTES
Donald H. Grangaard, Appleton, Wis., assignor to Kimberly-Clark Corporation, Neenah, Wis., a corporation of Delaware
Filed Dec. 27, 1966, Ser. No. 604,791
Int. Cl. B01k *3/08;* H01b *1/04*
U.S. Cl. 204—294  2 Claims

ABSTRACT OF THE DISCLOSURE

A gas porous, electrically conductive alkali-resistant electrode formed of activated carbon and a high wetting angle resinous material for use in the production of peroxides by electrolytic action. A method of forming an electrode from a dry mix of a heat activatable binder of high wetting angle and a catalyst in finely divided form.

BACKGROUND OF THE INVENTION

Field of the invention

This invention relates to the electrodes required for the process of preparing peroxides through the electrochemical reduction of oxygen. Since such electrodes must operate in alkaline media over an extended period of time, they must resist wetting by the alkaline electrolyte, while at the same time being of sufficient porosity so as to permit the passage of oxygen (or air) readily through the electrode.

Description of prior art

I have found that prior methods for preparing electrodes of the type required invariably necessitates a series of processing steps, some of which are extremely difficult to carry out. Not only are some of the steps difficult to carry out, but, in many instances, it is almost impossible to prepare the electrodes in the sizes desired. Further, such electrodes are far too costly for commercial usage.

I have found also that the prior methods of wet proofing such porous electrodes which involve dipping of the electrode in paraffin, or the like, are quite unsatisfactory.

SUMMARY OF THE INVENTION

Surprisingly, however, I have found that, if the catalytic material required for the electrode proper and a suitable heat activatable resinous binder are provided in powdered form, and intimately mixed, the resulting composition can, through a simple molding operation, be molded into a highly satisfactory electrode. Such an electrode not only has a relatively long service life but exhibits good efficiency. Further, the electrode does not require subsequent wet proofing and can be made at relatively low cost.

The binder for the purpose of this invention is required to be heat softenable and to be of such a nature that in the solid state it exhibits a relatively high wetting angle to aqueous alkaline electrolytes. The catalyst used for the electrode proper for the purpose of the invention may be a conventional catalytic material such as activated carbon. Basically, it appears that a substantially uniform mixture of such components, in suitable proportions, when pressed together and heated at least to and preferably in excess of the binder softening point, becomes united by the binder in such a manner that the product is porous, even at the relative high binder contents used.

It is, accordingly, a primary object of this invention to provide a novel process for the manufacture of electrodes having utility in the electrochemical reduction of oxygen.

It is another object of this invention to provide a new and novel electrode structure characterized by high surface area and pore volume relative to the electrode thickness, good porosity, good catalytic activity, and is structurally self-supporting.

In more specific aspect, I have found that the binder content of the molding mixture may be between about 40 to 60 parts by weight and the balance may be constituted by the catalytic material to the extent of 60 to 40 parts (or percent) by weight. The actual extent of the binder requirement is dependent upon the specific nature of the binder and the actual surface area of the catalytic material involved, as well as the strength required in the final electrode structure.

In general, it would appear that at the binder contents recommended, the porosity and the electrical conductivity should be almost entirely destroyed. Quite surprisingly, however, although the binder is present in such relatively large amounts, the effect of the binder on the porosity and in decreasing the electrical conductivity appears to be such as to be almost insignificant, while a material contribution is made in the areas of ease of fabrication, cost, structural strength, resiliency and resistance to wetting. Further, I have found that the suitability of particular resin for use as the binder appears to be more dependent upon the wetting angle it exhibits when in contact with the aqueous alkaline solution than it is upon such properties as the melting point or chemical nature. In fact, the performance of various electrodes formulated from materials as polyethylene, polystyrene, polytetrafluorethylene, and the like have been almost directly proportional to the wetting angle. The higher the wetting angle exhibited, the better the performance of the electrode over an extended period of time.

To suitably attain the object of the invention, the catalytic material I have found is desirably of very fine mesh, between about 100 and 325. The heat softenable resinous binder material is also of fine mesh though it may be somewhat more coarse than the catalytic material. Resinous materials having mesh sizes in the range of 30 to 100 have given satisfactory results.

An important factor in the practice of the invention appears to be the proportion by weight of the binder to the catalytic material. This can vary somewhat due to the surface area of the catalytic materials used. Apparently upon molding, an even distribution of the resin throughout the mass is desirable in order to obtain a uniform porosity. This is facilitated somewhat by small mesh size. This small mesh size also appears to contribute to improved product uniformity and strength.

The invention will be more fully understood by reference to the following examples and to the single figure of the drawing wherein a flow sheet indicating a preferred embodiment of the process of invention is illustrated.

DESCRIPTION OF THE PREFERRED EMBODIMENTS

Example 1

Thirty parts by weight of a commercially available polyethylene powder (molecular weight=about 18,000) of about 100 mesh, softening point of about 220° F., a melt index of 3.5, density of 0.918 (sold under the trade designation DYNF-1) are intimately mixed on a dry basis with an equal quantity by weight of activated carbon. The activated carbon is much more finely divided than the polyethylene and is of a mesh size of about 200 to 325. The mixture which, by volume, contains the activated carbon in the proportion of about 1.7 to 1, is placed in the cavity of a compression type mold, smoothed by striking, and pressed under heat to provide a flat electrode. The temperature to which the mixture is subjected in the press is about 300–350° F. At this temperature the carbon particles, of course, remain solid but the polyethylene becomes of sufficient fluidity to permeate throughout the mass. The mass itself does not flow. The fluidizing of the polyethylene is a relatively slow process due to the relatively poor heat transfer of the mold together with that of the mixture to be molded and, accordingly, the heat and pressure are applied for periods of time of the order of 15–30 minutes. After partial to substantially complete cooling of the mold to room temperature (70° F.), the pressed matreial is removed from the mold. With polyethylene as the binder, complete cooling of the mold before electrode removal is desirable but not necessary as the electrode will have considerable rigidity even though just cooled below the melting point of the binder.

Such an electrode appears to the eye as a complete carbon electrode. Other than adhesive strength and some degree of flexibility, the polyethylene does not add any physical property apparent to the eye. In fact, even at relatively high magnifications as obtained under the microscope, the presence of the polyethylene binder as a distinct entity is not apparent.

The elecrtode thus formed has adequate electrical conductivity, good strength, good porosity and good efficiency. The thickness is suitably about ⅛ inch and such an electrode is easily handleable since it is self-supporting and somewhat resilient. It has a weight per square foot of about 210–215 grams. Electrodes prepared in this manner having an effective area of 28 sq. in. have produced at an applied voltage of 2 volts 0.4 to 0.5 gram of peroxide/hour at a power consumption of 2 to 2.5 kwh./lb.

Example 2

Example 1 was repeated but employing a cross-linkable linear polyethylene resin. The binder in this instance had a mesh size of about 30 and a softening point of about 265° F. Accordingly, the temperature during pressing of the electrode was 300–350° F. and the time of pressing was 15 to 30 minutes. The resulting product showed good porosity, was relatively non-wetting, and was capable of producing peroxide at relatively high efficiency, viz 2 to 2.2 kwh./lb.

Example 3

Example 1 was repeated but employing polytetrafluorethylene resin (Teflon) instead of the polyethylene. The binder in this instance has a mesh size of about 100 and a softening point of 600–700° F. Accordingly, the temperature during pressing of the electrode was about 750° F. and the time of pressing was ½ to 1 hour.

In instances where it is impossible or extremely difficult to obtain the resin to be used as the binder in a finely divided form, successful electrodes have been prepared by dissolving the binder in a suitable solvent, then, through the addition of a non-solvent, precipitating the resin in finely divided form upon the carbon particles. Example 4 is illustrative of the formation of an eletcrode in this manner using polystyrene as the binder.

Example 4

25 grams polystyrene having a melting point of about 265° F. was dissolved in 100 cc. toluene. This solution was then slowly poured into a stirred solution of 25 grams of carbon in 750 cc. acetone. The resulting mixture (or suspension) was then filtered, and the residue washed with acetone. The mixture was then air dried and ground up. The powder obtained was then placed in a compression type mold, evenly distributed, and molded at 500 p.s.i. at 300° F. for 30 minutes. The mold was then cooled and the electrode removed.

This electrode, in the particular electrolytic cell in which it was tried, produced at an applied voltage of 2 volts 0.386 gram of peroxide/hour at a power consumption of 2.538 kwh./lb. The effective electrode area was about 28 sq. in.

The electrode, in accordance with this and the preceding examples, once they appear to lose efficiency, may be reactivated by a simple drying operation, that is, passing dry air through the electrode.

In the examples given, all the electrodes appear to produce peroxide at about the same efficiencies. The differences in the performance of the various electrodes thus is not evident from the data given in the examples. The main difference in the performance of the various electrodes is that of the operating life. The operating life of the electrode (i.e., the time it will efficiently produce peroxide without the necessity of redrying) has been found to be in direct relationship to the wetting angle of the resinous material used. Other factors remaining equal, the higher the wetting angle, the longer the life of the electrode before redrying of the electrode must be carried out.

Table I lists the wetting angles of these various resinous materials as given by Osipow in "Surface Chemistry," A.C.S. (Monograph, Reinhold Publishing Corporation, New York, 1962) pages 232 to 294. The actual performance of the various materials in terms of operating life of the electrode before redrying is required falls in the same order. Polytetrafluorethylene resin, other conditions being equal, is the best material for the purpose.

TABLE I

| Binder: | Contact or wetting angle for water at 20° C. |
| --- | --- |
| Polytetrafluorethylene | 120 |
| Paraffin | 108 |
| Polyethylene | 94 |
| Polystyrene | 91 |

The material used as the binder may thus be selected from a relatively large variety of materials. The important properties apparently are that the material have a high wetting angle (or contact angle) in excess of 90° preferably in the range of 94–120°, a workable melting point (or fusion temperature) and good stability in aqueous alkaline peroxide solutions. By a high wetting (or contact) angle I mean the angle (in the liquid phase) formed by the tangent to the liquid surface at the point of the liquid-solid interface.

It is to be noted that paraffin is useful, in accordance with this invention, when employed in solvent systems as described for instance in Example 4. However, such systems with paraffin are much less practical than the system described in my co-pending application Ser. No. 604,933 filed Dec. 27, 1966.

In the various examples given, equal amounts by weight of activated carbon and binder have been used. Experiments indicate that this ratio can be varied somewhat without drastically altering the performance of the electrode. The practical range appears to lie in the range of 40 to 60 parts activated carbon to 60 to 40 parts of the binder.

The carbons which I have found most useful have the following characteristics:

Surface area—500–1000 m.$^2$/gm.
Fineness:
    90–99% through 100 mesh
    70–90% through 200 mesh
    50–75% through 325 mesh
Pore volume (cc./gm.)—0.6–1.1
Density (lbs./cu. ft.)—9–18
Iodine value—90–96

Electrodes, when employed as substantially planar sheets in electrolytic cells specifically designed for the purpose, have exhibited useful lives such that they are of commercial utility. The electrode may, if desired, have other configurations and may, for example, be cylindrical.

As many apparently widely different embodiments of this invention may be made without departing from the spirit and scope thereof, it is to be understood that I do not limit myself to the specific embodiments thereof except as defined in the appended claims.

I claim:
1. An electrode for use in the electrochemical reduction of oxygen and which consists essentially of activated carbon particles in finely divided form and a high wetting angle resinous material which serves as a binder and a wet proofing agent for carbon particles, said agent having a contact angle with water of greater than 90° and retaining the particles together in a shaped gas porous mass, said activated carbon particles constituting between about 60–40% of the weight of the electrode and said resinous material constituting between about 40–60% of the weight of the electrode, said electrode being self-supporting.

2. An electrode according to claim 1 wherein the resinous material has a wetting angle of between about 94 and 120°.

References Cited

UNITED STATES PATENTS

| 1,577,981 | 3/1926 | Otto | 204—294 |
| 3,248,267 | 4/1966 | Langer et al. | |
| 3,305,400 | 2/1967 | Barber et al. | |
| 3,385,780 | 5/1968 | Feng | 204—294 |

FOREIGN PATENTS

| 931,732 | 7/1963 | Great Britain. |
| 946,308 | 1/1964 | Great Britain. |

JOHN H. MACK, Primary Examiner

D. R. JORDAN, Assistant Examiner

U.S. Cl. X.R.

252—511; 136—120